US011474122B2

(12) United States Patent
Zhou et al.

(10) Patent No.: US 11,474,122 B2
(45) Date of Patent: Oct. 18, 2022

(54) WHEEL SPEED SENSOR

(71) Applicant: Bendix Commercial Vehicle Systems LLC, Elyria, OH (US)

(72) Inventors: Nianqing Zhou, Avon, OH (US); Daniel P. Zula, North Ridgeville, OH (US); Jon D. Intagliata, Avon, OH (US); Timothy J. Frashure, Columbia Station, OH (US); Joseph M. Macnamara, Ashland, OH (US)

(73) Assignee: Bendix Commercial Vehicle Systems LLC

( * ) Notice: Subject to any disclaimer, the term of this patent is extended or adjusted under 35 U.S.C. 154(b) by 110 days.

(21) Appl. No.: 17/076,966

(22) Filed: Oct. 22, 2020

(65) Prior Publication Data
US 2022/0128586 A1 Apr. 28, 2022

(51) Int. Cl.
*G01P 1/02* (2006.01)
*B60C 19/00* (2006.01)

(52) U.S. Cl.
CPC .............. *G01P 1/026* (2013.01); *B60C 19/00* (2013.01); *B60C 2019/004* (2013.01)

(58) Field of Classification Search
CPC .... G01P 1/026; B60C 19/00; B60C 2019/004
See application file for complete search history.

(56) References Cited

U.S. PATENT DOCUMENTS

| | | | |
|---|---|---|---|
| 6,392,406 B1 | 5/2002 | Palfenier | |
| 6,400,135 B1 | 6/2002 | Skoff | |
| 6,523,425 B1 | 2/2003 | Kubik | |
| 6,539,800 B2 | 4/2003 | Yamashita | |
| 2002/0007675 A1* | 1/2002 | Yamashita | G01P 3/44 29/525.01 |
| 2013/0195389 A1* | 8/2013 | Seki | F16C 33/768 384/446 |
| 2013/0249273 A1* | 9/2013 | Norimatsu | F16C 41/007 301/109 |
| 2017/0174332 A1* | 6/2017 | Rook | F16F 7/10 |
| 2017/0239989 A1* | 8/2017 | Downs | G01P 3/487 |

OTHER PUBLICATIONS

Bendix Commercial Vehicle Systems LLC, "Bendix WS-24 Antilock Wheel Speed Sensor," SD-13-4860 Service Data Sheet, Apr. 2019, 6 pages, Bendix Commercial Vehicle Systems LLC, Elyria Ohio U.S.A.

* cited by examiner

*Primary Examiner* — Alvaro E Fortich
*Assistant Examiner* — Zannatul Ferdous

(57) ABSTRACT

A wheel speed sensor comprises a body, the body being overmolded and having a head zone and a coil zone. The wheel speed sensor also includes a cylindrical metallic canister fitted on the coil zone of the body, wherein the head zone has an equal or smaller diameter than the cylindrical metallic canister. The wheel speed sensor also comprises a cable, wherein the cable extends from the head zone. The wheel speed sensor is sized to be blindly insertable entirely through a bore in an associated mounting apparatus.

15 Claims, 6 Drawing Sheets

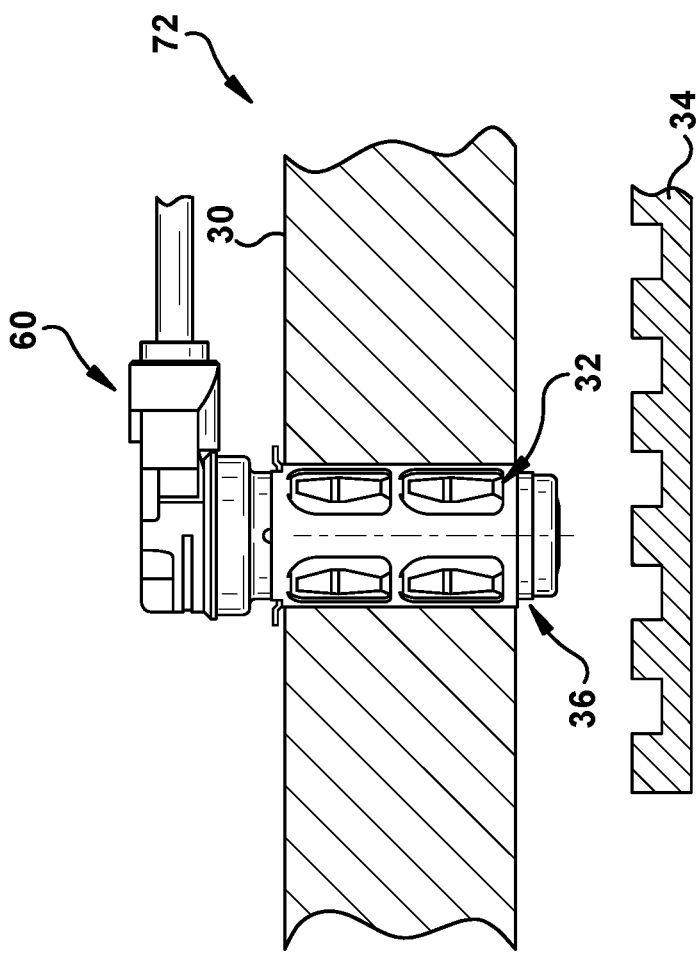
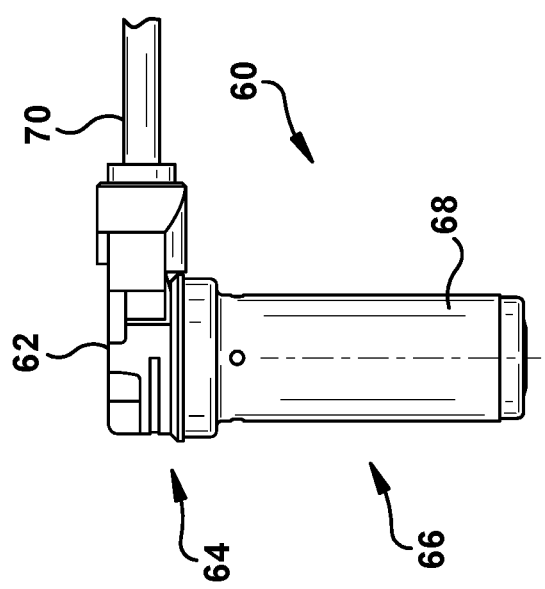
Fig. 2A (Prior Art)
Fig. 2B (Prior Art)

WHEEL SPEED SENSOR

BACKGROUND

The present application relates to a wheel speed sensor designed to fit in several wheel end configurations.

Commercial vehicles include wheel speed sensors that generate signals indicative of the speed of individual wheels on the vehicle. The wheel speed information is used for a variety of purposes including providing an indication of vehicle speed to the vehicle operator through a dashboard or other interface and in the control of anti-lock braking systems and stability control systems. Wheel speed sensors on commercial vehicles typically come in two different styles, a straight sensor and a right angle sensor, each specially designed fit into different wheel end configurations. The two types of sensors may be necessary on the same vehicle due to different wheel end configurations, causing the possibility of incorrect installations and lost work time if the manufacturer or technician tries to install the wrong wheel speed sensor.

In some configurations, a mounting block is integrated onto the wheel axle. In other configurations, the mounting of the wheel speed sensor is integrated into another portion of the wheel end assembly, such as the brake flange. The wheel speed sensor must be installed in a manner to avoid interference of the sensor body or its cable with the disc brake or drum brake assembly while still being close enough to the rotating exciter ring to generate a signal.

Therefore, wheel speed sensor manufacturers need to carry multiple configurations of wheel speed sensors to fit different wheel end assemblies. Vehicle manufacturers and technicians need to have multiple configurations of wheel speed sensors on hand as well as understand how to install the correct wheel speed sensor in each type of wheel end assembly. Accordingly, those skilled in the art continue with research and development efforts in the field of wheel speed sensor designs.

SUMMARY

In accordance with one embodiment, a wheel speed sensor comprises a body, the body being overmolded and having a head zone and a coil zone. The wheel speed sensor also includes a cylindrical metallic canister fitted on the coil zone of the body, wherein the head zone has an equal or smaller diameter than the cylindrical metallic canister. The wheel speed sensor also comprises a cable, wherein the cable extends from the head zone. The wheel speed sensor is sized to be blindly insertable entirely through a bore in an associated mounting apparatus.

In accordance with another embodiment, a sensing assembly for a commercial vehicle comprises a mounting apparatus in a wheel end of the commercial vehicle; an exciter ring affixed to a rotating member of an axle of the commercial vehicle; and a wheel speed sensor. The wheel speed sensor comprises a body, the body being overmolded and having a head zone and a coil zone. The coil zone is encapsulated in a cylindrical metallic canister and the head zone has an equal or smaller diameter than the coil zone. The wheel speed sensor is sized to be insertable entirely through the mounting block until a face of the wheel speed sensor coil zone contacts the exciter ring. The sensing assembly also comprises a cable, wherein the cable extends from the head zone; and a clamping sleeve frictionally fitted between the wheel speed sensor and the mounting apparatus for maintaining the position of the wheel speed sensor in the mounting block.

BRIEF DESCRIPTION OF THE DRAWINGS

FIGS. 2A and 2B are representations of a prior art right angle wheel speed sensor and installation.

DETAILED DESCRIPTION

Figure 1B:
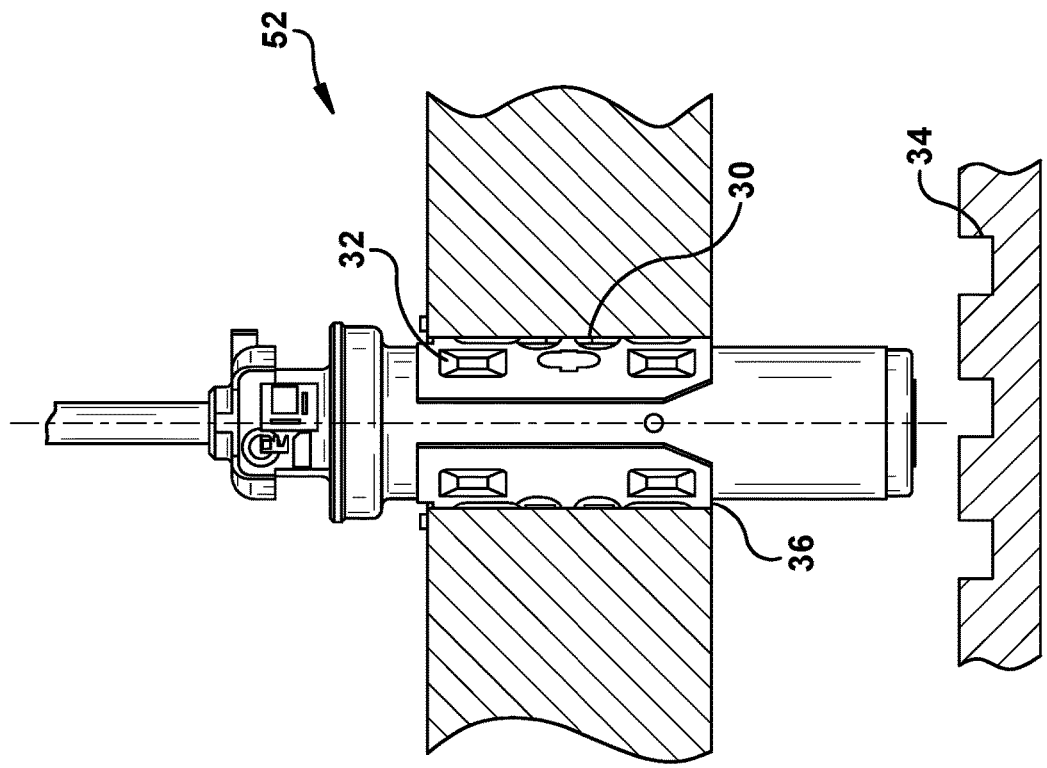
FIGS. 1A and 1B are representations of a prior art straight wheel speed sensor and installation.
Figure 1A:
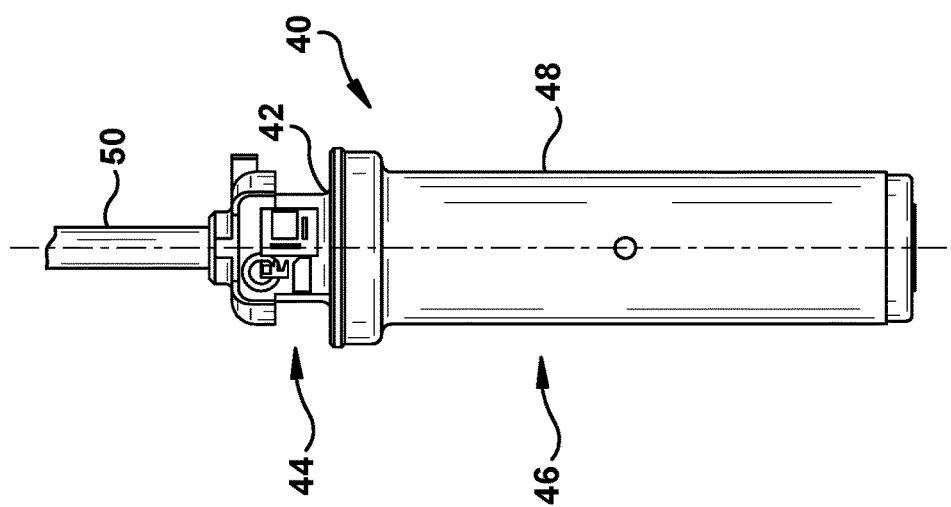

Referring to FIG. 1A, a portion of a conventional straight wheel speed sensor (WSS) 40 is illustrated. The straight WSS 40 may comprise a passive wheel speed sensor, such as a WS-24™ wheel speed sensor manufactured by Bendix Commercial Vehicle Systems LLC of Elyria, Ohio. A passive wheel speed sensor generates signals when current is generated in a wound coil as a result of magnetic induction occurring in response to movement of an exciter ring.

The straight WSS 40 has a body 42 that includes a head zone 44 and a coil zone 46. The coil zone 46 is about 57.5 mm in length and the head zone 44 is about 20.5 mm in length.

The coil zone 46 is enclosed by a cylindrical metallic canister 48. The diameter of the canister 48 is between about 15.87 mm and 15.98 mm over the entire length. The diameter of the head zone 44 is about 21.2 mm at its widest diameter. A cable 50 extends from the head zone 44 and terminates in a connector (not shown).

Referring to FIG. 1B, a conventional wheel end sensor assembly 52 having the straight WSS 40 includes a sensor mounting apparatus 30. In one example, the mounting apparatus 30 may be a mounting block affixed to an axle of the vehicle. In another example, the mounting apparatus may be a bushing that is held by an interference fit in a flange on the axle of the vehicle. The straight WSS 40 is positioned within a bore 36 in the mounting apparatus 30 and spaced near an exciter ring 34. The straight WSS 40 is secured within the mounting apparatus 30 using a metal clamping sleeve 32 that is inserted into the bore 36 in the mounting apparatus 30 prior to insertion of the straight WSS 40. The clamping sleeve 32 establishes a spring force between the outer surface of the straight WSS 40 and the inner surface of the bore 36 to inhibit movement of the straight WSS 40 relative to the mounting apparatus 30. The bore 36 has a diameter of about 18 mm. Therefore, while the coil zone 46 of the straight WSS 40 fits through the bore 36, the diameter of the head zone 44 is too large to permit that portion of the straight WSS 40 to be inserted through the bore 36.

The wheel end sensor assembly 52 also includes the exciter ring 34 (sometimes referred to as a "tone wheel") that is mounted to a wheel hub or other rotating member (not shown) that rotates with the vehicle wheel. The exciter ring 34, of which a portion is shown in FIG. 1B, may be stamped steel or cast iron. The exciter ring 34 defines a plurality of regularly spaced teeth. The width and depth of the teeth varies depending on the material and method used to make the exciter ring 34. Rotation of the exciter ring 34 relative to the stationary straight WSS 40 causes a change in current and/or voltage in sensing element in the straight WSS 40 as the teeth of the exciter ring 34 move past the face of the straight WSS 40, thereby providing an indication of the change in rotational position of the wheel. The peak to peak voltage signal from the straight WSS 40 increases the closer the face of the coil zone 46 is to the exciter ring 34.

Referring to FIG. 2A, a portion of a conventional right angle wheel speed sensor (WSS) 60 is illustrated. The right angle WSS 60 may also comprise a passive wheel speed sensor, such as a WS-24™ wheel speed sensor manufactured by Bendix Commercial Vehicle Systems LLC of Elyria, Ohio.

The right angle WSS 60 has a body 62 that includes a head zone 64 and a coil zone 66. The coil zone 66 is about 40 mm in length and the head zone 64 is about 14.4 mm in length, shorter than the overall length of the straight WSS 40.

The coil zone 66 may be enclosed by a cylindrical metallic canister 68. The diameter of the canister 68 is between about 15.87 mm and 15.98 mm over the entire length. The diameter of the head zone 64 is about 36 mm at the widest diameter.

A cable 70 extends from the head zone 64 at a right angle from the axis of the coil zone 66. The cable 70 terminates in a connector (not shown). If the sensing element in the right angle WSS 60 would be an active sensing element, the head zone 64 must be oriented at a certain angle with respect to the exciter ring 34. The cable 70 must exit the head zone 64 at a ninety degree angle to the axis of the coil zone 66, but the cable 70 may need to shift from between about forty five degrees to about one hundred and thirty five degrees within the plane of the cable 70 to accommodate the precise orientation of the active sensing element while allowing the right angle WSS 60 to fit within the wheel end assembly. This requirement increases the variants of the right angle WSS 60 required to be made available.

Referring to FIG. 2B, a conventional wheel end sensor assembly 72 having a right angle WSS 60 includes the mounting apparatus 30. The right angle WSS 60 is positioned within the bore 36 in the mounting apparatus 30 and spaced near to the exciter ring 34. The right angle WSS 60 is secured within the mounting apparatus 30 using the metal clamping sleeve 32 that is inserted into the bore 36 in the mounting apparatus 30 prior to insertion of the right angle WSS 60. The clamping sleeve 32 establishes a spring force between the outer surface of the right angle WSS 60 and the inner surface of the bore 36 to inhibit movement of the right angle WSS 60 relative to the mounting apparatus 30. The bore 36 has a diameter of about 18 mm. Therefore, while the coil zone 66 of the right angle WSS 60 fits through the bore 36, the diameter and shape of the head zone 64 does not permit that portion of the right angle WSS 60 to be inserted through the bore 36.

The above-described wheel end sensor assemblies 52, 72 have performed well for their intended purpose. However, different wheel end configurations require manufacturing and maintaining the two different body styles—the straight WSS 40 and the right angle WSS 60—resulting in increased costs for design, manufacturing and inventory management.

Figure 3A:
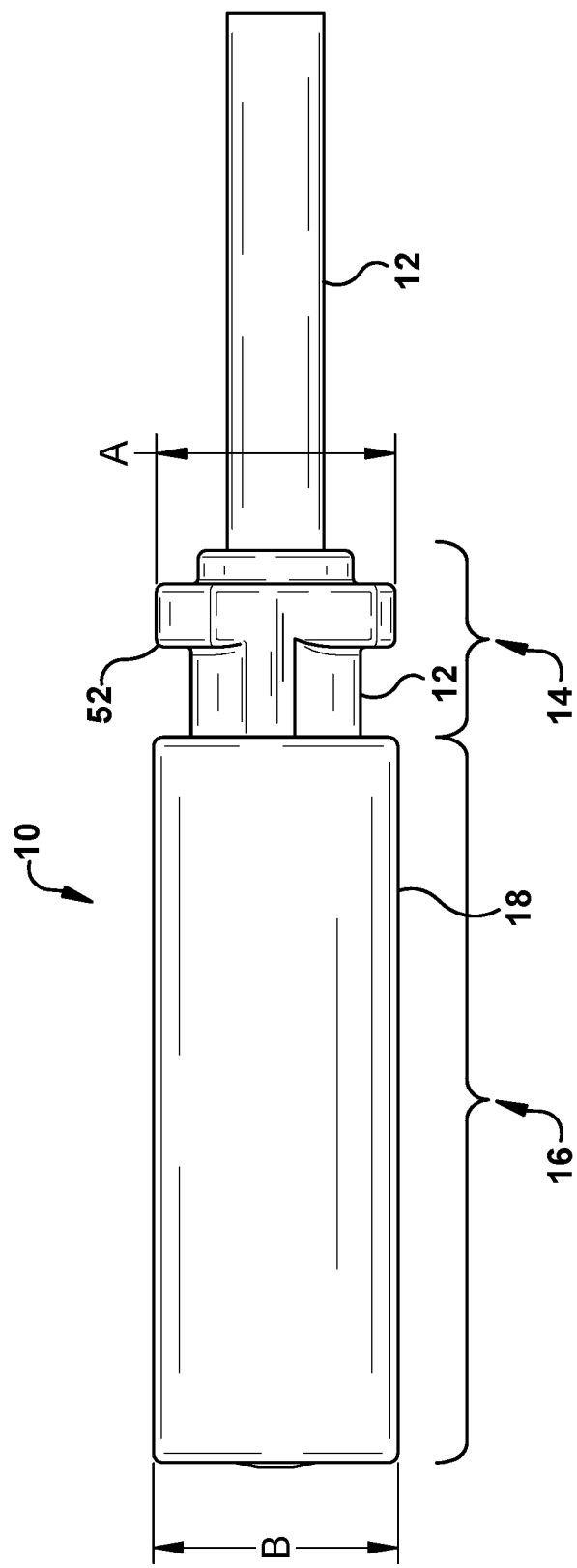
FIGS. 3A, 3B and 3C are representations of the inventive wheel speed sensor and its installation.

FIG. 3A shows a universal wheel speed sensor (WSS) 10 according to one aspect of the invention. The universal WSS 10 may be a passive or active sensing device. A passive wheel speed sensor generates signals when current is generated in a wound coil as a result of magnetic induction occurring in response to movement of the exciter ring. An analog signal is transmitted from a passive wheel speed sensor. An active wheel speed sensor may comprise a magnet and a magneto-resistive or Hall Effect active sensing circuit that transmits a digital output signal in response to the movement of the exciter ring.

The universal WSS 10 has a body 12 that includes a head zone 14 and a coil zone 16. The body 12 is overmolded, meaning the sensing element, either the wound coil or the active sensing circuit, is fully encapsulated in a plastic material. The coil zone 16 of the body 12 is fitted with a cylindrical canister 18 with a uniform diameter. The canister 18 may be a metallic material, such as stainless steel. The canister 18 may be press fit onto the body 12 to encapsulate the coil zone 16. In another example, the canister 18 may be crimped onto the body. With a metallic canister 18, impact against a metallic exciter ring is possible without damaging the universal WSS 10. This is opportune when different types of exciter rings are used. During some installations, due to space constraints as well as to be sure the sensor will transmit signals, the universal WSS 10 must be installed abutting the exciter ring. The canister 18 may rub against the exciter ring 34 while developing the proper operational air gap between the universal WSS 10 and the exciter ring 34.

The coil zone 16 is about 47.6 mm in length and the head zone 14 is about 12.0 mm in length. The diameter B of the canister 18 is between about 15.87 mm and 15.98 mm over the entire length.

Figure 3B:
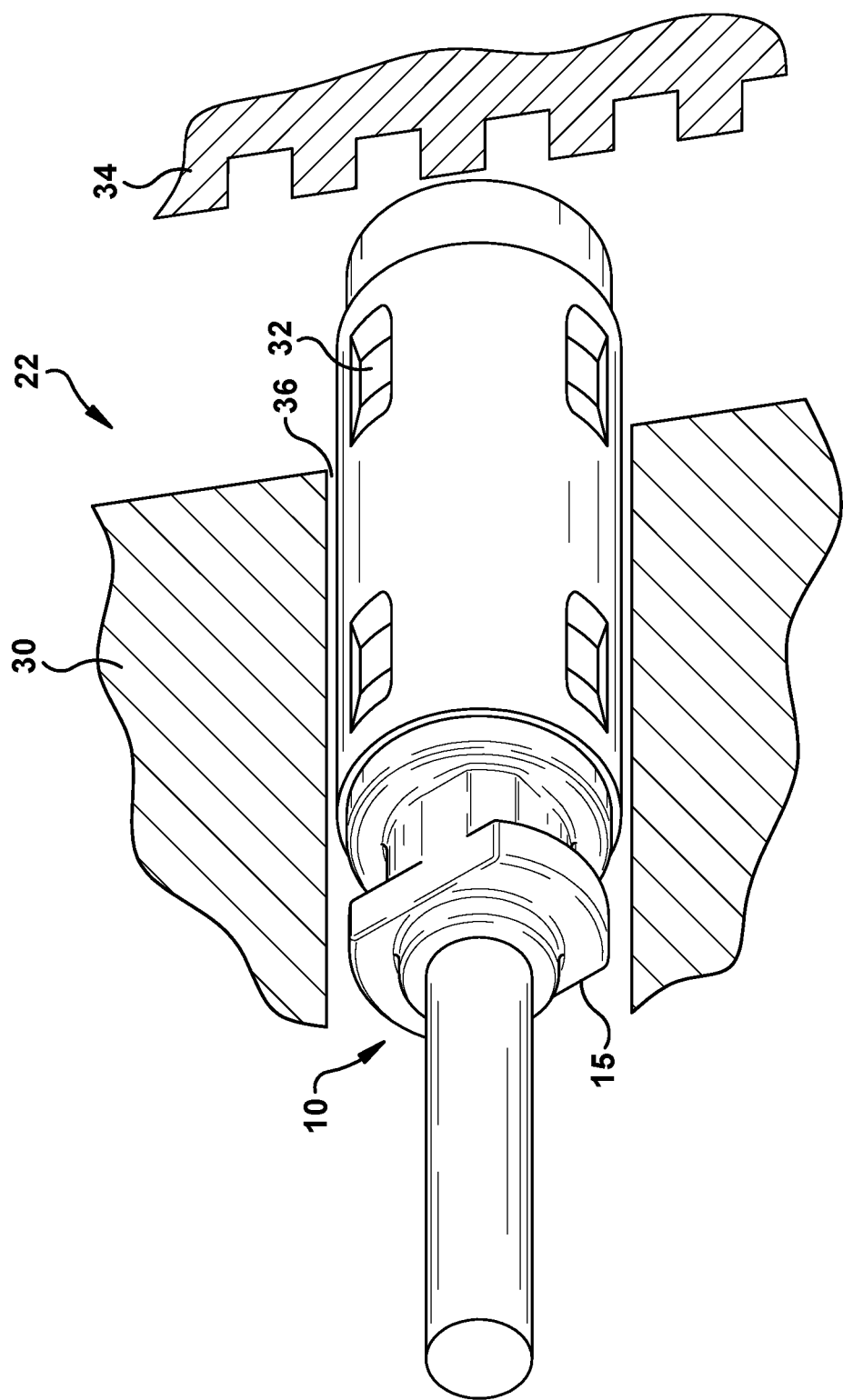

The head zone 14 includes an elliptical portion 15 with flat sides (shown more clearly in FIG. 3B). The diameter A of the head zone 14 around the elliptical portion 15 is about 15.5 mm maximum. The elliptical portion 15 can serve as a location for tools to grip when the universal WSS 10 needs to be removed from its mounting location. A cable 20 extends from the head zone 14 and terminates in a connector (not shown). The universal WSS 10 can be rotated in any direction and rotation is not inhibited by the location of the cable 20.

The length of the coil zone 16 and the head zone 14 is about 59.7 mm.

Therefore, a wheel speed sensor comprises a body, the body being overmolded and having a head zone and a coil zone. The wheel speed sensor also includes a cylindrical metallic canister fitted on the coil zone of the body, wherein the head zone has an equal or smaller diameter than the cylindrical metallic canister. The wheel speed sensor also comprises a cable, wherein the cable extends from the head zone. The wheel speed sensor is sized to be blindly insertable entirely through a bore in an associated mounting apparatus.

Referring to FIG. 3B, the universal WSS 10 is installed in a first wheel end sensor assembly 22, similar to wheel end sensor assemblies 52, 72. The first wheel end sensor assembly 22 includes the universal WSS 10 and the mounting apparatus 30. The universal WSS 10 is positioned within the bore 36 in the mounting apparatus 30 and spaced next to the exciter ring 34. The universal WSS 10 is secured within the mounting apparatus 30 using the metal clamping sleeve 32 that is inserted into the bore 36 prior to insertion of the universal WSS 10. The clamping sleeve 32 establishes a spring force between the outer surface of the universal WSS 10 and the inner surface of the bore 36 to inhibit movement of the universal WSS 10 relative to the mounting apparatus 30. The bore 36 has a diameter of about 18 mm. Since the diameter A of the head zone 14 and the diameter B of the coil zone 16 are both less than the 18 mm diameter of the bore 36, the entire universal WSS 10 is able to slide entirely through the bore 36.

The first wheel end sensor assembly 22 also includes the exciter ring 34 that is mounted to a wheel hub or other rotating member (not shown) that rotates with the vehicle wheel. The exciter ring 34 may be stamped steel or cast iron. The exciter ring 34 defines a plurality of regularly spaced teeth. Rotation of the exciter ring 34 relative to the universal WSS 10 also causes a change in current and/or voltage in sensing element in the universal WSS 40 as the teeth of ring 34 move past the face of the universal WSS 10, thereby providing an indication of the change in rotational position of the wheel. The universal WSS 10 is able to provide an improved signal output because the installer is able to push universal WSS 10 as close as possible and even abut the exciter ring 34 as there is no interference between the head zone 14 and the mounting apparatus 30.

The over-all sensor length of the universal WSS 10 is designed so that the universal WSS 10 can engage with the exciter ring 34 through the mounting apparatus 30. The length is also designed so that the universal WSS 10 can be easily wound through other wheel end components to reach mounting apparatus 30 and the exciter ring 34. The universal WSS 10 eliminates the need for having both the right angle WSS 60 and straight WSS 40 variants for most commercial vehicle applications.

When installed in the mounting apparatus 30, the universal WSS 10 may extend beyond the end of the mounting block by between about 15% to about 20% of its total body length.

Figure 3C:
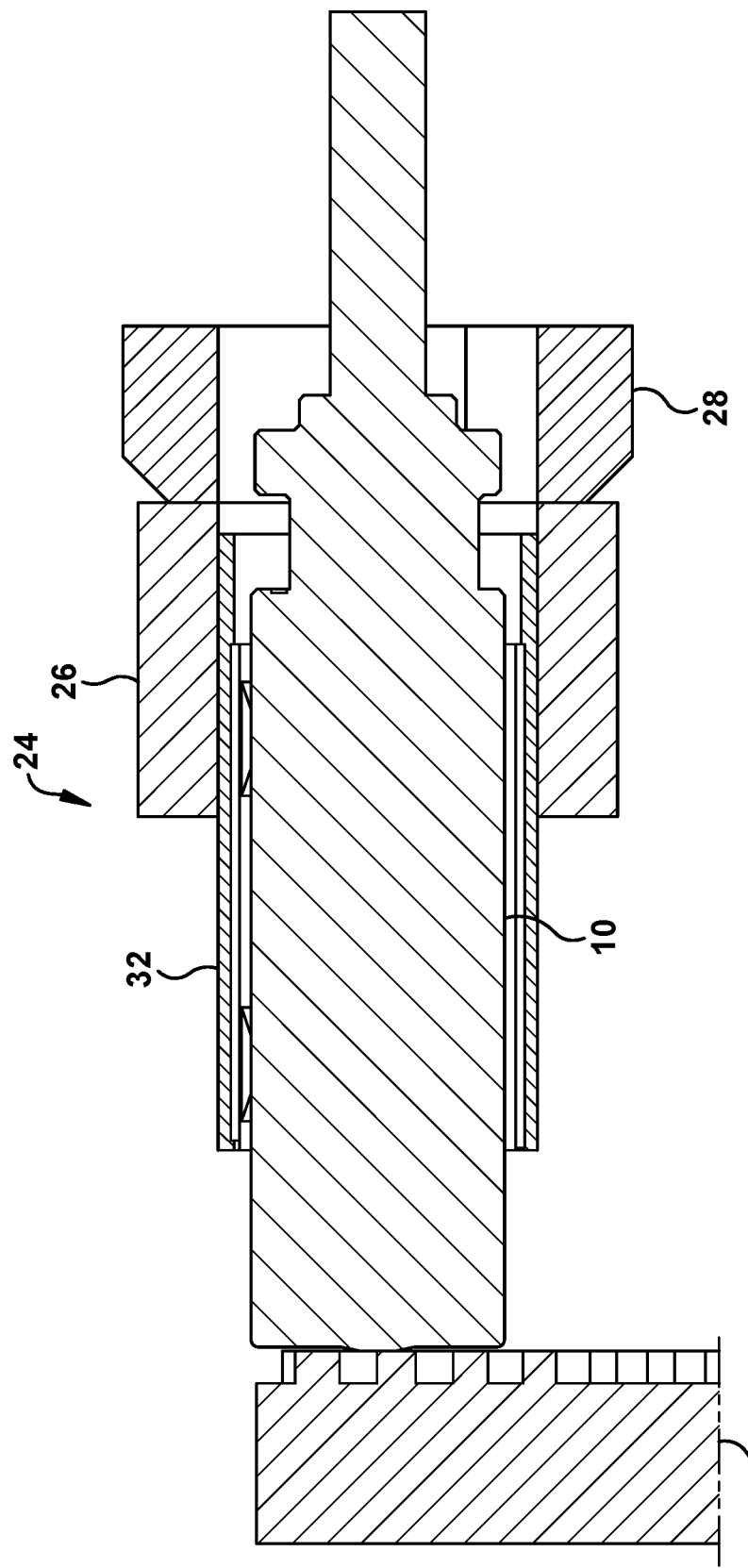

FIG. 3C shows the universal WSS 10 installed in a second wheel end sensor assembly 24. In this second wheel end assembly 24, the mounting apparatus is a bushing 26. The universal WSS 10 is inserted through both the bushing 26 and an axial flange 28. The axial flange 28 is part of the wheel end axis. The bushing 26 is affixed to a torque plate of the wheel end (not shown). Both the bushing 26 and axial flange 28 have openings of 18 mm diameter, similar to the mounting apparatus bore 36. The overall length of the bushing 26 and axial flange 28 may be longer than the overall length of the universal WSS 10.

The largest diameter of the universal WSS 10 is the canister 18. The universal WSS 10 is more flexible and able to fit through blind installations, where the installing technician cannot see directly the location through which the universal WSS 10 must be fit.

Therefore, the sensing assembly comprises In accordance with another embodiment, a sensing assembly for a commercial vehicle comprises a mounting apparatus in a wheel end of the commercial vehicle; an exciter ring affixed to a rotating member of an axle of the commercial vehicle; and a wheel speed sensor. The wheel speed sensor comprises a body, the body being overmolded and having a head zone and a coil zone. The coil zone is encapsulated in a cylindrical metallic canister and the head zone has an equal or smaller diameter than the coil zone. The wheel speed sensor is sized to be insertable entirely through the mounting block until a face of the wheel speed sensor coil zone contacts the exciter ring. The sensing assembly also comprises a cable, wherein the cable extends from the head zone; and a clamping sleeve frictionally fitted between the wheel speed sensor and the mounting apparatus for maintaining the position of the wheel speed sensor in the mounting block.

Having a single shape for the wheel speed sensor is beneficial in eliminating the possibility of installing the wrong wheel speed sensor in a wheel end, as the universal WSS 10 will fit nearly every wheel end. The universal WSS 10 does not interfere with wheel end components, such as a torque plate or an axle flange. Having the shape be straight for the universal WSS 10 is particularly beneficial for active sensing element applications. Since the universal WSS 10 is fully rotatable in the mounting block, the sensing element can be precisely oriented with respect to the exciter ring without worrying about which angle the cable will exit, as with the right angle WSS 60. The universal WSS 10 can be physically keyed for orientation with respect to the mounting apparatus 30 and still be properly installed without concern of interference at the wheel end.

Figure 4:
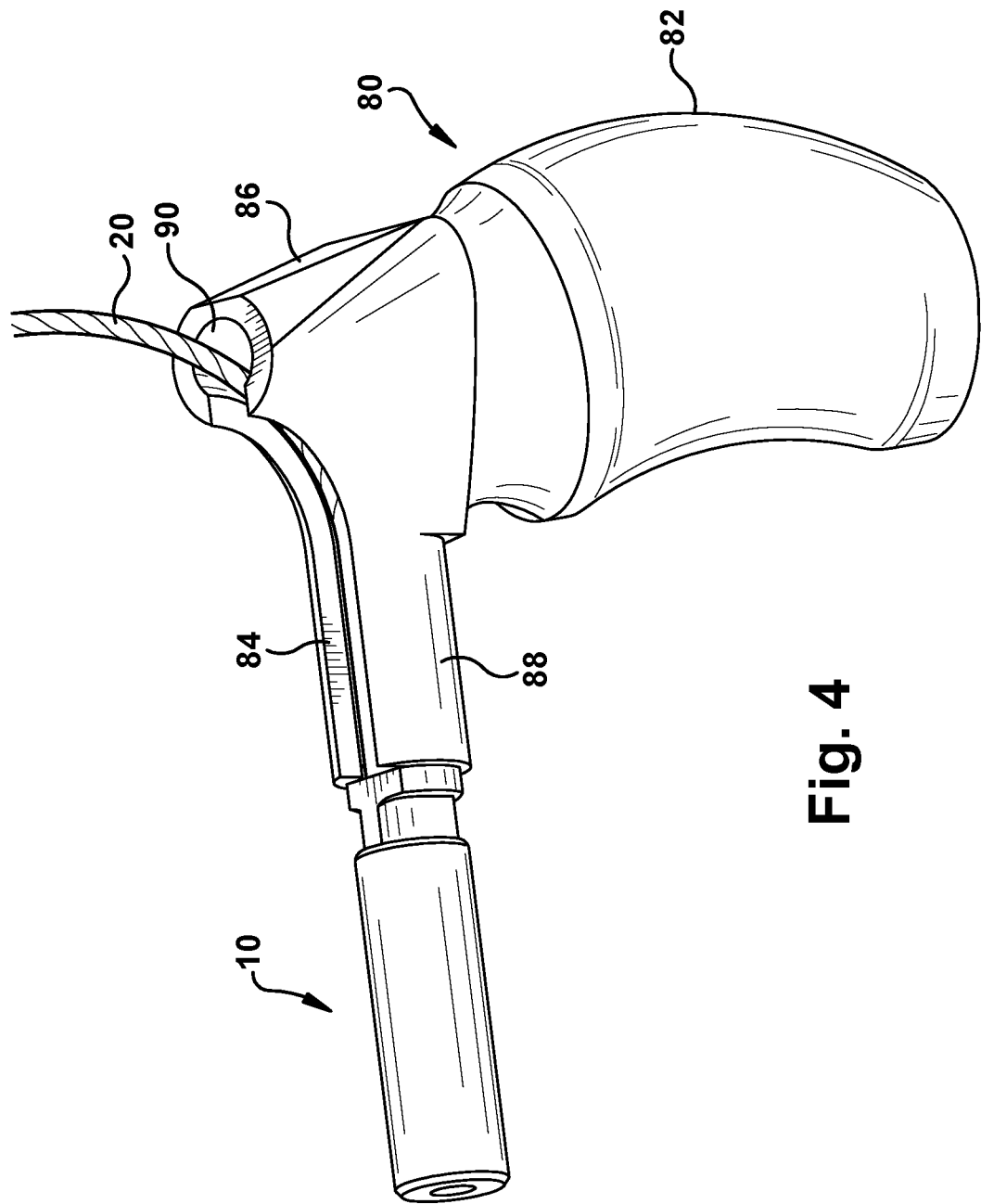
FIG. 4 is a representation of an installation tool for use with the inventive wheel speed sensor.

FIG. 4 shows an installation tool 80 for the universal WSS 10. The installation tool 80 includes a handle 82 and a sensor holding portion 86 connected to the handle 82. The handle 82 and the sensor holding portion 86 may be a single piece or may be separate pieces attached together. The installation tool 80 may be made of plastic or other material. In one example, the installation tool 80 may be 3D printed. The sensor holding portion 86 includes a cylindrical portion 88 and a truncated pyramid portion 86.

As shown, the head portion 14 of the universal WSS 10 is placed next to a distal end of the cylindrical portion 88. The cable 20 of the universal WSS 10 is placed into a groove 84 of the cylindrical portion 88. The cable 20 lies in a groove 84 in the cylindrical portion 88 and exits at an aperture 90 in the top of the truncated pyramid 86. This configuration helps hold the universal WSS 10 steady during installation.

The installation tool 80 allows the original equipment manufacturer or a maintenance technician to easily position the universal WSS 10 for installation in the mounting apparatus, especially if the mounting apparatus is in a location difficult to see directly. The manual force necessary to fully install the universal WSS 10 into the mounting apparatus is typically about 150 N. With the installation tool 80, the universal WSS 10 can be installed in more wheel end configurations because the recess and the sensor is shorter.

When the universal WSS 10 is an active wheel speed sensor, the installation tool 80 can be used to orient the sensor properly with respect to the exciter ring. For example, the elliptical portion 15 of the universal WSS 10 can be aligned with a feature on the cylindrical portion 88 to keep the universal WSS 10 in one position so it will not rotate during the installation process. In another example, the universal WSS 10 can be physically keyed to mate with the mounting apparatus 30 to maintain the universal WSS 10 in the proper orientation.

Therefore, a method of installing a wheel speed sensor in a wheel end assembly comprises forming an installation tool having a handle; and a sensor holding portion having a cylindrical portion with a groove and a truncated pyramidal portion. The method includes placing the wheel speed sensor at a distal end of the cylindrical portion; fitting a cable of the wheel speed sensor in the groove threading it through an aperture in the truncated pyramidal portion; and pressing the wheel speed sensor through a mounting apparatus at the wheel end using manual force on the handle until the wheel speed sensor contacts an exciter ring.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A wheel speed sensor comprising:
   a body, the body being overmolded and having an axially aligned head zone and a coil zone to entirely insertable through a bore;

a single cylindrical metallic canister fitted on the coil zone of the body, wherein the head zone has an equal or smaller diameter than the cylindrical metallic canister, and a cable, wherein the cable extends axially from the head zone; wherein the wheel speed sensor 1s sized to be blindly insertable entirely through a bore in an associated mounting apparatus.

2. The wheel speed sensor as in claim 1, wherein the wheel speed sensor is one of a passive sensor and an active sensor.

3. The wheel speed sensor as in claim 1, wherein the head zone includes an elliptical portion with flat sides proximate to the cable.

4. The wheel speed sensor as in claim 1, wherein the length of the coil zone is about 47 mm.

5. The wheel speed sensor as in claim 1, wherein the diameter of the canister and the head zone is about 16 mm.

6. The wheel speed sensor as in claim 1, further comprising the metallic canister being press fit onto body and encapsulating the coil zone.

7. A sensing assembly for a commercial vehicle comprising:
a mounting apparatus in a wheel end of the commercial vehicle;
an exciter ring affixed to a rotating member of an axle of the commercial vehicle;
a wheel speed sensor, the wheel speed sensor comprising
a body, the body being overmolded and having an axially aligned head zone and a coil zone to entirely insertable through a bore, wherein the coil zone is encapsulated in a single cylindrical metallic canister and the head zone has an equal or smaller diameter than the coil zone; wherein the wheel speed sensor is sized to be insertable entirely through the mounting block until a face of the wheel speed sensor coil zone contacts the exciter ring;
a cable, wherein the cable extends axially from the head zone; and
a clamping sleeve frictionally fitted between the wheel speed sensor and the mounting apparatus for maintaining the position of the wheel speed sensor in the mounting block.

8. The sensing assembly as in claim 7, wherein the length of the coil zone is about 47 mm.

9. The sensing assembly as in claim 7, wherein between about 15% and about 20% of the sensor length extends beyond an end of the mounting apparatus when installed.

10. The sensing assembly as in claim 7, wherein the diameter of the canister is about 16 mm.

11. The sensing assembly as in claim 7, wherein the head zone is elliptically shaped with two flats.

12. The sensing assembly as in claim 7, further the metallic canister is press fit onto the body.

13. The sensing assembly as in claim 7, wherein the wheel speed sensor is capable of being rotated at any angle with respect to the mounting apparatus during installation.

14. A method of installing a wheel speed sensor in a wheel end assembly comprising:
forming an installation tool having
a handle; and
a sensor holding portion having a cylindrical portion with a groove and a truncated pyramidal portion,
placing the wheel speed sensor at a distal end of the cylindrical portion;
fitting a cable of the wheel speed sensor in the groove threading it through an aperture in the truncated pyramidal portion; and
pressing the wheel speed sensor through a mounting apparatus at the wheel end using manual force on the handle until the wheel speed sensor contacts an exciter ring.

15. The method of installing the wheel speed sensor as in claim 14, further comprising:
orienting the wheel speed sensor with a feature in the cylindrical portion and maintaining the orientation of the wheel speed sensor when pressing through the mounting apparatus so that the wheel speed sensor aligns with the exciter ring.

* * * * *